US011089760B2

(12) United States Patent
Aylen et al.

(10) Patent No.: US 11,089,760 B2
(45) Date of Patent: Aug. 17, 2021

(54) AMMONIA REDUCING AGENT FOR ANIMAL BEDDINGS AND LITTERS

(71) Applicant: Absorbent Products Ltd., Kamloops (CA)

(72) Inventors: Peter Aylen, Kamloops (CA); Steve Gurney, Kamloops (CA); Jennifer Bylycia, Kamloops (CA)

(73) Assignee: ABSORBENT PRODUCTS LTD., Kamloops (CA)

( * ) Notice: Subject to any disclaimer, the term of this patent is extended or adjusted under 35 U.S.C. 154(b) by 0 days.

(21) Appl. No.: 14/440,829

(22) PCT Filed: Nov. 1, 2013

(86) PCT No.: PCT/CA2013/050833
§ 371 (c)(1),
(2) Date: May 5, 2015

(87) PCT Pub. No.: WO2014/067012
PCT Pub. Date: May 8, 2014

(65) Prior Publication Data
US 2015/0289473 A1 Oct. 15, 2015

Related U.S. Application Data

(60) Provisional application No. 61/722,469, filed on Nov. 5, 2012.

(51) Int. Cl.
*A01K 1/015* (2006.01)
*B01J 20/14* (2006.01)
*B01J 20/22* (2006.01)
*B01J 20/12* (2006.01)
*A01N 31/04* (2006.01)
*A01N 33/20* (2006.01)

(52) U.S. Cl.
CPC .......... *A01K 1/0154* (2013.01); *A01K 1/0152* (2013.01); *A01K 1/0155* (2013.01); *A01N 31/04* (2013.01); *A01N 33/20* (2013.01); *B01J 20/12* (2013.01); *B01J 20/14* (2013.01); *B01J 20/22* (2013.01)

(58) Field of Classification Search
CPC ...... A01K 1/0152; A01K 1/0107; A01K 1/01; A01K 1/015; B01J 20/3028; B01J 20/2803; B01J 20/3293; B01J 20/3042; B01J 20/28019; B01J 20/28023; B01J 20/3295; B01J 2/003; B01J 2/20
USPC .......... 119/173, 171, 172, 166, 526; 502/80, 502/401, 62, 72, 81
See application file for complete search history.

(56) References Cited

U.S. PATENT DOCUMENTS

| 1,792,657 | A | * | 2/1931 | Pasternack | C07C 51/42 34/494 |
|---|---|---|---|---|---|
| 3,509,254 | A | | 4/1970 | Krotinger et al. | |
| 3,650,968 | A | | 3/1972 | Hoffman et al. | |
| 4,405,354 | A | * | 9/1983 | Thomas, II | A01K 1/0152 71/21 |
| 4,509,457 | A | * | 4/1985 | Durbye | A01K 1/0154 119/171 |
| 4,638,763 | A | | 1/1987 | Greenberg | |
| 4,957,063 | A | | 9/1990 | Heitfeld et al. | |
| 5,039,481 | A | | 8/1991 | Pacifici et al. | |
| 5,054,434 | A | * | 10/1991 | Wax | A01K 1/0152 119/171 |
| 5,089,258 | A | * | 2/1992 | Zaid | A61K 8/365 424/489 |
| 5,097,799 | A | | 3/1992 | Heitfeld et al. | |
| 5,109,805 | A | | 5/1992 | Baldry et al. | |
| 5,450,817 | A | | 9/1995 | Hahn et al. | |
| 5,876,707 | A | | 3/1999 | Birbara et al. | |
| 6,129,892 | A | | 10/2000 | Garrett | |
| 6,413,506 | B1 | | 7/2002 | Levi et al. | |
| 6,523,496 | B1 | | 2/2003 | Keithly et al. | |
| 6,708,647 | B2 | | 3/2004 | Keithly et al. | |
| 6,749,804 | B2 | | 6/2004 | Schneider et al. | |
| 6,767,553 | B2 | | 7/2004 | Sun et al. | |
| 6,860,232 | B2 | | 3/2005 | Keithly et al. | |
| 6,942,883 | B2 | | 9/2005 | Keithly et al. | |
| 7,229,612 | B2 | | 6/2007 | Levi et al. | |
| 7,393,521 | B2 | | 7/2008 | Hruza | |
| 7,434,540 | B2 | * | 10/2008 | Aylen | A01K 1/0152 119/173 |
| 7,753,002 | B2 | | 7/2010 | Wang et al. | |
| 8,268,018 | B2 | | 9/2012 | Privitera et al. | |
| 9,010,273 | B2 | * | 4/2015 | Adamy | A01K 1/0152 119/171 |
| 2003/0133993 | A1 | | 7/2003 | Hutcheson et al. | |
| 2003/0164144 | A1 | * | 9/2003 | Keithly | A01K 1/0152 119/171 |
| 2003/0205204 | A1 | | 11/2003 | Wang et al. | |
| 2004/0131581 | A1 | | 7/2004 | Hutcheson et al. | |
| 2007/0277739 | A1 | * | 12/2007 | Wang | A01K 1/0154 119/161 |
| 2009/0000562 | A1 | | 1/2009 | Jenkins et al. | |
| 2009/0007852 | A1 | | 1/2009 | Fritter et al. | |
| 2011/0033410 | A1 | * | 2/2011 | Lawson | A61L 9/01 424/76.6 |
| 2011/0184006 | A1 | | 7/2011 | Goonesekara et al. | |
| 2011/0303157 | A1 | | 12/2011 | Laubenstein | |
| 2012/0012064 | A1 | | 1/2012 | Jenkins et al. | |

FOREIGN PATENT DOCUMENTS

| CA | 2 465 634 A1 | 6/2003 |
|---|---|---|
| CA | 2 653 395 A1 | 12/2007 |

(Continued)

OTHER PUBLICATIONS

Office Action issued in counterpart Canadian Application No. 2,890,146, dated May 20, 2015 (2 pages).

(Continued)

*Primary Examiner* — Peter M Poon
*Assistant Examiner* — Jeffrey R Larsen
(74) *Attorney, Agent, or Firm* — Ferguson Braswell Fraser Kubasta PC

(57) ABSTRACT

The present invention provides a composition for reducing ammonia levels in animal bedding or litter, comprising 0.015-40% citric acid and one or more of a clay-based particulate, diatomaceous earth or an organic material. The composition can also comprise an anti-microbial agent. A method of treating animal bedding or litter to reduce ammonia is also provided.

23 Claims, No Drawings

(56) References Cited

FOREIGN PATENT DOCUMENTS

| CA | 2 680 786 A1 | 9/2008 |
|---|---|---|
| EP | 2377612 A1 | 10/2011 |
| JP | 63315200 A | 12/1988 |
| JP | 3112426 A | 5/1991 |
| JP | 2000116264 A | 4/2000 |
| WO | 2004/083129 A1 | 9/2004 |

OTHER PUBLICATIONS

International Search Report in corresponding PCT/CA2013/050833 dated Feb. 4, 2014 (2 pages).
Written Opinion in corresponding PCT/CA2013/050833 dated Feb. 4, 2014 (5 pages).
Response to Written Opinion in corresponding PCT/CA2013/050833 dated Aug. 12, 2014 (29 pages).
International Preliminary Report on Patentability in corresponding PCT/CA2013/050833 dated Dec. 19, 2014 (24 pages).
Carr, Lewis E. et al.; "Broiler Response to Three Ventilation Rates"; 1980 American Society of Agricultural Engineers 0001-2351/80/2302-0414502.0; pp. 414-418 (5 pages).
D.P. Anderson et al.; "The Adverse Effects of ammonia on Chickens Including Resistance to Infection with Newcastle Disease Virus"; American Association of Avian Pathologists, Avian Diseases, vol. 8, No. 3; Aug. 1964; pp. 369-379 (12 pages).
S. Shah et al.; "Poultry Litter Amendments"; North Carolina State University A&T Statement University Cooperative Extension; 2006 (2 pages).
Supplemental Response to Written Opinion of the International Searching Authority in corresponding PCT/CA2013/050833 dated Nov. 27, 2014 (4 pages).

* cited by examiner

AMMONIA REDUCING AGENT FOR ANIMAL BEDDINGS AND LITTERS

CROSS-REFERENCE TO RELATED APPLICATION

The present application is a national phase application of PCT/CA2013/050833 filed on Nov. 1, 2013. The present application also claims priority under 35 U.S.C. § 119(e) to U.S. Provisional Patent Application Ser. No. 61/722,469, filed on Nov. 5, 2012, the entire contents of which are herein incorporated by reference.

FIELD

The present invention relates to a composition comprising an ammonia reducing agent for animal beddings and litters.

BACKGROUND

The respiratory systems of horses, cattle, hogs, poultry, and domestic pets can be harmed by the presence of ammonia in their barns, stalls, pens and other enclosures. At high enough levels, the damage can adversely affect weight gain and feed conversion [Carr and Nicolson, 1980: "Broiler Response to three Ventilation rates, Am Soc. Arg. Eng 2: 414-418]. It is therefore desirable to reduce the quantity of ammonia to which these animals are exposed.

Ammonia is formed by enzymatic hydrolysis of urea, which is present in animal waste. The hydrolysis is catalyzed by the enzyme urease, which is produced by certain microorganisms that are commonly found in animal waste. Inhibition of microbial growth through the addition of an antimicrobial agent to animal waste should therefore reduce ammonia production.

Inhibiting microbial growth is also desirable because certain microbes can directly harm animals. For example, *Staphylococcus, Streptococcus* and *Escherichia coli* bacteria cause mastitis, a disease of the mammary tissue of dairy cows. Other bacteria have been known to increase the mortality rates of poultry and reduce weight gain in other animals.

As a household pet litter, clay-based absorbent materials are typically used in un-admixed form and in sufficient quantity to effectively adsorb the entire volume of the pet urine into the particulate material to maintain dry conditions in the litter box. For this purpose, clay-based materials, which have good absorbency characteristics, are commonly used. In such applications, all or substantially all of the absorbed urine is brought into intimate contact with the antibacterial agent carried in or on the particulate absorbent material thereby establishing conditions favourable to significant reductions in bacterial growth in litter applications disclosed in Baldry et al., U.S. Pat. No. 5,109,805.

However, large animal stall and poultry barn bedding applications are subject to vastly different conditions than those of domestic pet litter applications. In order to cope with the very large volumes of urine produced by large animals such as horses and cows, or large numbers of animals, such as poultry or hogs, absorbent stall bedding materials must be applied to the stall floor in large quantities and changed frequently. In view of cost considerations, a clay-based absorbent material such as the domestic litter disclosed in Baldry et al. is excluded as a suitable large animal stall bedding material. Instead, the bedding materials of choice for large animal stalls and poultry barns are wood shavings and/or saw dust and/or straw, which are commonly available at a relatively low price.

Bedding and litter amendments are typically added to bedding materials to reduce ammonia formation. These amendments can offer numerous benefits to the industry. For example, reducing ammonia loss can increase the nutrient value of the bedding or litter while improving air quality. Reducing ammonia production may reduce ventilation needs and energy costs. Pathogen and pest levels can be reduced as well as unpleasant odours. More importantly, a reduction in ammonia can reduce eye and respiratory irritation, and improve health in animals. This reduction can also improve the quantity and the quality of the yields for farmers.

There are many types of bedding and litter amendments, including acidifiers, adsorbers, inhibitors, microbial and insecticide treatments. Typically, these materials are added in different stages as required over the bedding or litter material. This can be time consuming and less cost effective. Further, the materials can be particularly hazardous, corrosive or an irritant. Examples of chemicals used are aluminum sulfate, sulfuric acidified clay and sodium bisulfate.

Acidifiers have been used in reducing the presence of ammonia from waste material (U.S. Pat. No. 4,405,354 to Thomas I I et al.). Keithly et al. (U.S. Pat. Nos. 6,860,232, 6,708,647, 6,523,496) describe the use of a citric acid peel application in commercial bedding to reduce ammonia. However, increased moisture in the application, typically over 12%, can result in undesired mold growth.

The direct application of citric acid to bedding or litter can pose certain problems. For example, using citric acid alone in poultry houses poses increased risks to the health of farm workers and to the farmed animals. Citric acid is commonly sold as a granular solid (similar to table sugar), which can be excessively dusty to apply and difficult to store. Liquid citric acid is available but it is harder to transport and store, and also poses a host of difficulties when sprayed. It is corrosive to most metal surfaces and causes drying and cracking of rubber or plastic seals so appropriate liquid storage containers can be hard to find and costly to upkeep. Solid citric acid generates a dust that is harsh to breathe. Further, both forms of citric acid can cause skin irritation, and can cause drying of mucous membranes (nose, sinuses, lungs, etc) for both workers and poultry. This is particularly critical for the birds that are housed in poultry barns. If the birds ingest a quantity of pure crystallized citric acid, it can cause burns and lacerations of the digestive track, possibly leading to a failure of the bird to thrive, and even death.

In addition, pure citric acid is hydroscopic, meaning it will pull in any moisture available out of the air. Storage of pure citric acid can be difficult. If left too long, a bulk tote of citric acid will become a solid mass of citric acid due to the absorption of moisture.

Japanese patent document JP3112426 describes the use of citric acid directly on bedding for reducing ammonia, which as stated above is less than desirable. Further, the levels of ammonia were tested by smelling, not through any substantive analytical testing. It has been shown that ammonia levels as low as 20 ppm (which is barely detectable by the human sense of smell) can cause damage to the respiratory tract of chickens and turkeys and interfere with the bird's ability to clear bacteria and viruses from its lungs. Airborne ammonia, even at this low amount, can cause damage to trachaeal mucous membranes in broilers. As ammonia level increases to 25 ppm and higher, there can be increased damage to lungs and air sacs, leading to respiratory illnesses. The increased ammonia can also cause reduction in body weight and, as mentioned above, a failure to thrive. D. P. Anderson, C. W. Beard and R. P. Hanson. The Adverse Effects of Ammonia on Chickens Including Resistance to Infection with Newcastle Disease Virus. *Avian Diseases. Vol.* 8, No. 3 (August, 1964), pp. 369-379, Published by: American Association of Avian Pathologists Article Stable URL: http://www.jstor.org/stable/1587967

Therefore, a need remains for a cost-effective and safe method of employing the ammonia reducing properties of known materials to both large and small animal bedding and litter applications.

SUMMARY

In accordance with one aspect there is provided a composition for reducing ammonia levels in animal beddings or litters comprising citric acid and one or more of a clay-based particulate, organic material or diatomaceous earth. Optionally, the composition can comprise an insecticide if a clay-based particulate and/or an organic material is/are used. An antimicrobial agent may also be present. Exemplary antimicrobial agents include Bronopol™ and Myacide™.

In accordance with another aspect of the present invention, there is provided a composition for reducing ammonia levels in an animal bedding or litter comprising 3.5% to 95% w/w citric acid and one or more of a clay-based particulate, organic material or diatomaceous earth.

The amount of citric acid in the composition can be 0.2-95% w/w, 5-50% w/w, 5-30% w/w, 5% w/w, 10% w/w, 15% w/w, 20% w/w, 30% w/w, 35% w/w, or 40% w/w for example, of the composition. In certain embodiments, the amount of citric acid in the composition is 35%.

The clay-based particulate can be smectite, attapulgite, sepiolite, bentonite, kaolinite, gypsum, zeolite, montmorillonite, or a combination thereof. In certain embodiments, the particulate is montmorillonite. The organic material can be a wood-based material and/or an agricultural by-product as would be understood to the skilled person.

Typically, the moisture content of the citric acid is less than 12%, less than 5%, less than 1% or less than 0.5%.

In another aspect there is provided a method of reducing ammonia content in animal bedding or litter comprising the step of applying the composition as described herein thereto.

In accordance with another aspect, there is provided an animal bedding or litter amendment for an animal housing comprising 0.00015-40% citric acid, and one or more of a clay-based particulate, diatomaceous earth or an organic material. In particular embodiments, the animal bedding or litter amendment comprises 0.00015-0.15% citric acid.

In another aspect there is provided an animal bedding or litter amendment comprising 0.015%-40% (w/w) citric acid. In particular embodiments, the animal bedding or litter amendment comprises 0.015-1.5% citric acid.

Advantageously, a composition as described herein minimizes clumping of the citric acid and allows even spreading of the product through a mechanized spreader, such as a fertilizer spreader or spinner spreader. The product can also have insecticidal properties.

Embodiments of the present invention should each have at least one of the above-mentioned object and/or aspects, but do not necessarily have all of them. Additional and/or alternative features, aspects, and advantages of embodiments of the present invention will become apparent from the following description, the accompanying drawings, and the appended claims.

DETAILED DESCRIPTION

In accordance with one aspect of the present invention, there is provided a composition for treating animal bedding or animal litter, comprising citric acid and one or more of a clay-based particulate, organic material or diatomaceous earth. The composition can be used particularly in large scale animal facilities including animal housing. As used herein, "animal housing" can include large animal barns, animal stalls, poultry houses, or other facilities used to house animals.

Typically, the terms "bedding" and "litter" can be used interchangeably in both commercial and domestic settings. For the purpose of the present application, these terms hold slightly different meanings to distinguish them. As used herein, "animal bedding" can include any material on which an animal resides, sleeps, and deposits its excreta thereupon, such as that found in horse stalls, poultry houses, or guinea pig cages. However, as used herein, "animal litter" can include any material on which an animal routinely deposits its excreta but typically does not reside upon or sleep upon, such as cat litter.

Bedding, in ethology and animal husbandry, is material, usually organic, used by animals to support their bodies when resting or otherwise stationary. It reduces pressure on skin, prevents heat loss, and contamination by waste produced by an animal or those it shares living space with. Typical animal bedding can include a layer of straw, wood shavings, and/or sawdust in an amount conventionally used on barns or animal stall floors. Bedding or litter can be an absorbent material, such as granulated clay, for covering the floor of an animal's cage or excretory box. Bedding or litter can include animal waste such as manure, other animal waste, and/or a combination of existing animal bedding and animal waste. For example, poultry bedding (or litter) or broiler bedding is a mixture of poultry excreta, spilled feed, feathers, and material used as bedding or litter in poultry operations. This term is also used to refer to unused bedding or litter materials.

As used herein, "organic material" can include, but is not limited to hay, wood-based materials, wood by-products or agricultural by-products. "Wood-based materials" or "wood by-products" can include wood shavings, sawdust, wood flour, pellets or mulch, for example. "Agricultural by-products" can include stalks of grain, straw, corn hulls, rice hulls, cotton seed, peanut shells and the like, for example.

The present composition is particularly suitable as a bedding or litter amendment for reducing ammonia in the bedding of an animal. As used herein, a "bedding amendment" or "litter amendment" refers to a substance added to a bedding or litter material to reduce deleterious effects produced by the bedding or litter, such as ammonia accumulation, thus improving the quality of the bedding or litter for the animal and farm worker. The present composition is particularly useful as a bedding or litter amendment in animal stalls, such as large animal barns and the like. Typically, the bedding or litter amendment is added on top or otherwise mixed in with the bedding or litter material, rather than during the fabrication process of the bedding or litter material. However, the composition can also be used in a domestic pet litter, such as cat litter.

The composition can also comprise a material having insecticidal properties. If an insecticide is used, any suitable material for use in bedding or litter may be contemplated. Desirably, diatomaceous earth is used. The diatomaceous earth component is effective as an insecticidal agent to reduce the number insects or insect larvae in the stall or barn.

The composition can comprise a clay-based particulate. The clay-based particulate can comprise any of a number of suitable clay minerals including, for example, smectite, attapulgite, sepiolite, bentonite, kaolinite, gypsum, and zeolite. Ideally, the clay mineral is montmorillonite.

An antimicrobial agent can optionally be added. Typically, the antimicrobial agent is 2-bromo-2-nitropropane-1, 3-diol which is sold under the trade name Bronopol™ and is in solid white crystal form sold under the trade name Myacide™. It can be present in the clay-based particulate in a concentration of from 50 to 250 ppm. The antimicrobial agent can be combined into the clay-based particular in the manner described in Baldry et al., supra. In particular, the antimicrobial agent may be admixed with the clay material during the particle forming process.

While any suitable ammonia reducing agent can be used in the present composition, it is desirable to use citric acid. In certain embodiments, the citric acid is present in an amount of 0.015-95% w/w, ideally between about 5-50%, 5-20% or 5-40% of the composition, particularly at 5%, 10%, 15%, 20%, 30%, 35%, or 40% w/w of the bedding or litter amendment. The citric acid is ideally in a solid, powder form with can be easily dispersed within the amendment, such as with the clay-based particulate, the diatomaceous earth, the organic material. If desired, the anti-microbial agent may then be applied to the mixture.

The pH of the composition is typically between about pH 2 to pH 6, particularly between about pH 2.3 to pH 5.8, and more particularly about pH 3.

The present composition is applied to the animal bedding or litter in an amount of about 40 pounds per 500-1,000 sqft (given a typical bag of 40 lbs (18 kg)). Ideally, one advantage of the present composition is a lower application rate, i.e., amount used per unit of area. Further, the combination of insecticide and ammonia reducing agent in one application can additionally be beneficial. This reduces costs, both in the quantity of material used and the time required for labour.

Ideally, the present composition can be organic certified. Because it does not contain any harsh chemicals as known in the art, the composition can meet or exceed animal feed grade or food grade quality.

Advantageously, the citric acid in the present composition has a reduced moisture content. Typically, the citric acid used in the present composition is in a solid (powder) form for mixing with the clay-based particulate, diatomaceous earth or organic material, and has a moisture content less than 5%, less than 1% or more particularly less than 0.5%.

Further, the present composition avoids the use of harmful chemicals (such as sodium bisulfate) by instead comprising a weak organic acid. This is particularly helpful to both the human workers and animals being exposed thereto as it is less of an irritant and reduces harmful effects.

EXAMPLES

Example 1: Ammonia Emissions from Test Material

Samples were analyzed to determine the ability of the present composition to absorb an ammonia odor. 200 mL of a representative sample of Diatomaceous Earth with varying percentages of Citric Acid was placed in each of several beakers. With a pipette, a specified amount of ammonia was added to each test beaker (2 mL, 5 mL, 15 mL, 20 mL, 25 mL and 30 mL). Beakers were covered with Parafilm™ and allowed to stand. Samples were read at different time intervals (1 hr, 4 hr, 8 hr, 24 hr, 48 hr, 72 hr and 96 hr) using a Drager™ Xam-5000 gas detection meter ("detector").

To analyze the quantity of ammonia, the detector was activated and tubing from the detector was inserted into each beaker allowing minimal outside air exposure. The detector was turned off and reset between each time interval.

Tables 1, 2 and 3 indicate the results of testing with Citric Acid, Aluminum Sulphate, and Sodium Bisulphate at rates of 10%, 15% and 20% (w/w) mixed with APL Diatomaceous Earth granular (Barn fresh) exposed to 2 ml of ammonia per 200 ml of product.

TABLE 1

Detection of ammonia in a sample comprising citric acid in parts per million (ppm)
CITRIC ACID

|       | 10%   | 15%   | 20%   |
|-------|-------|-------|-------|
| 1 hr  | 0 ppm | 0 ppm | 0 ppm |
| 4 hr  | 0 ppm | 0 ppm | 0 ppm |
| 24 hr | 0 ppm | 0 ppm | 0 ppm |
| 48 hr | 0 ppm | 0 ppm | 0 ppm |
| 72 hr | 0 ppm | 0 ppm | 0 ppm |
| 96 hr | 0 ppm | 0 ppm | 0 ppm |
| pH    | 2.90  | 2.76  | 2.68  |

Note:
pH tested at 40% in solution (30 g of sample (Diatomaceous Earth with varying amounts of Citric acid) was added to a beaker and mixed with 75 ml of de-ionized water).

TABLE 2

Detection of ammonia in a sample comprising aluminum sulphate in parts per million (ppm)
ALUMINUM SULPHATE

|       | 10%   | 15%   | 20%   |
|-------|-------|-------|-------|
| 1 hr  | 0 ppm | 0 ppm | 0 ppm |
| 4 hr  | 0 ppm | 0 ppm | 0 ppm |
| 24 hr | 0 ppm | 0 ppm | 0 ppm |
| 48 hr | 0 ppm | 0 ppm | 0 ppm |
| 72 hr | 0 ppm | 0 ppm | 0 ppm |
| 96 hr | 0 ppm | 0 ppm | 0 ppm |
| pH    | 2.64  | 2.54  | 2.34  |

Note:
pH tested at 40% in solution.

TABLE 3

Detection of ammonia in a sample comprising sodium bisulphate in parts per million (ppm)
SODIUM BISULPHATE

|       | 10%   | 15%   | 20%   |
|-------|-------|-------|-------|
| 1 hr  | 0 ppm | 0 ppm | 0 ppm |
| 4 hr  | 0 ppm | 0 ppm | 0 ppm |
| 24 hr | 0 ppm | 0 ppm | 0 ppm |
| 48 hr | 0 ppm | 0 ppm | 0 ppm |
| 72 hr | 0 ppm | 0 ppm | 0 ppm |
| 96 hr | 0 ppm | 0 ppm | 0 ppm |
| pH    | 4.01  | 3.95  | 3.90  |

Note:
pH tested at 40% in solution.

Example 2: Ammonia Emissions from Test Material at Different Concentrations of Ammonia The next trial tested a lower concentration of citric acid and aluminum sulphate at 5% and 10% mixed with APL Diatomaceous Earth granular (Barn Fresh (BF)) exposed to higher levels of ammonia 5 ml and 10 ml per 200 ml of product. Sodium Bisulphate was not included in this second trial to be exposed to higher levels of ammonia as the MSDS indicates under "Stability and Reactivity Materials to Avoid: Ammonia." Tables 4a and 5a indicate the results; Tables 4b and 5b indicate the pH of the samples as tested.

TABLE 4a

Detection of ammonia in a sample comprising citric acid in parts per million (ppm)
CITRIC ACID

|  | Citric Acid 5% + Barn Fresh @ 5 ml of $NH_3$ | Citric Acid 10% + BF @ 5 ml of $NH_3$ | Citric Acid 5% + BF @ 10 ml of $NH_3$ | Citric Acid 10% + BF @ 10 ml of $NH_3$ |
|---|---|---|---|---|
| 1 hr | 0 ppm | 0 ppm | 72 ppm | 0 ppm |
| 4 hr | 0 ppm | 0 ppm | 20 ppm | 0 ppm |
| 24 hr | 6 ppm | 0 ppm | 9 ppm | 0 ppm |
| 48 hr | 4 ppm | 0 ppm | 7 ppm | 0 ppm |

TABLE 4b pH of samples as tested

|  | Citric Acid 5% + BF | Citric Acid 10% + BF |
|---|---|---|
| pH | 3.41 | 2.95 |

Note: pH tested at 40% in solution.

TABLE 5a

Detection of ammonia in a sample comprising aluminum sulphate in parts per million (ppm)
ALUMINUM SULPHATE

|  | Aluminum Sulphate 5% + BF @ 5 ml of $NH_3$ | Aluminum Sulphate 10% + BF @ 5 ml of $NH_3$ | Aluminum Sulphate 5% + BF @ 10 ml of $NH_3$ | Aluminum Sulphate 10% + BF @ 10 ml of $NH_3$ |
|---|---|---|---|---|
| 1 hr | 37 ppm | 15 ppm | 45 ppm | 21 ppm |
| 4 hr | 10 ppm | 0 ppm | 7 ppm | 0 ppm |
| 24 hr | 7 ppm | 5 ppm | 7 ppm | 2 ppm |
| 48 hr | 5 ppm | 0 ppm | 6 ppm | 0 ppm |

TABLE 5b pH of samples as tested

|  | Aluminum Sulphate 5% + BF | Aluminum Sulphate 10% + BF |
|---|---|---|
| pH | 2.90 | 2.69 |

Note: pH tested at 40% in solution.

Acid pH @ 1% in solution: Citric Acid: 3.45, Aluminum Sulphate: 4.23, Sodium Bisulphate: 3.00, Activated Barn fresh Citric Acid 20%-pH 1% in Solution=3.74

Example 3: Ammonia Detection Using 20% Citric Acid

In this example, 20% Citric Acid+APL Diatomaceous Earth Granular (BF) were combined with higher levels of ammonia to determine if the increases in ammonia could still be controlled with 20% Citric Acid over time and what the affect would be. Household ammonia pH 11 was added at amounts of 15 ml, 20 ml, 25 ml and 30 ml per 200 ml of product (20% Citric Acid+BF). Results are presented in Table 6.

TABLE 6

Detection of ammonia in a sample comprising citric acid in parts per million (ppm)

|  | Citric Acid 20% + BF @ 15 ml $NH_3$ | Citric Acid 20% + BF @ 20 ml $NH_3$ | Citric Acid 20% + BF @ 25 ml $NH_3$ | Citric Acid 20% + BF @ 30 ml $NH_3$ |
|---|---|---|---|---|
| 1 hr | 19 ppm | 25 ppm | 126 ppm | 145 ppm |
| 4 hr | 0 ppm | 0 ppm | 86 ppm | 102 ppm |
| 8 hr | 0 ppm | 0 ppm | 0 ppm | 6 ppm |
| 24 hr | 0 ppm | 0 ppm | 0 ppm | 0 ppm |

The results indicate that although the increase in ammonia did result in airborne ammonia readings after 1 hr overtime after 24 hrs all readings were back down to 0 ppm. 20% Citric Acid+BF at 15 ml and 20 ml was down to 0 ppm at the 4 hr reading. The mixture exposed to 25 ml of $NH_3$ was down to 0 ppm at the 8 hr reading and the 30 ml $NH_3$ sample was down to 0 ppm after 24 hrs. Overall, it appears that a 10-20% citric acid content in the sample would be effective at removing ammonia odor.

Example 4: Ammonia Control Testing, Acidifying pH

The purpose of this fourth set of trials was to determine if adding higher ammonia concentrations to the various rates of Citric Acid+BF would still control ammonia effectively. Results are shown in Table 7a and 7b. Tests were done by adding Citric Acid at rates of 5%, 10%, 15%, 20%, 30%, 40%, 90%, 95% to the Diatomaceous Earth (BF) (Table 7a) and 35% citric acid (Table 7b). Household ammonia (pH=11) were added at a higher rate of 30 ml per 200 ml of product at the various blends to see if an increase in ammonia can still be controlled at these levels. Airborne ammonia levels were tested at 1 hr, 4 hr, 8 hr, 24 hr.

TABLE 7a

Detection of ammonia at different citric acid levels
CITRIC ACID

|  | 5% Citric Acid + BF @ 30 ml $NH_3$ | 10% Citric Acid + BF @ 30 ml $NH_3$ | 15% Citric Acid + BF @ 30 ml $NH_3$ | 20% Citric Acid + BF @ 30 ml $NH_3$ | 30% Citric Acid + BF @ 30 ml $NH_3$ | 40% Citric Acid + BF @ 30 ml $NH_3$ | 90% Citric Acid + BF @ 30 ml $NH_3$ | 95% Citric Acid + BF @ 30 ml $NH_3$ |
|---|---|---|---|---|---|---|---|---|
| 1 hr | >300 ppm | >300 ppm | >300 ppm | 150 ppm | 100 ppm | 0 ppm | 0 ppm | 0 ppm |
| 4 hr | >300 ppm | >300 ppm | 98 ppm | 105 ppm | 50 ppm | 0 ppm | 0 ppm | 0 ppm |

TABLE 7a-continued

Detection of ammonia at different citric acid levels
CITRIC ACID

| | 5% Citric Acid + BF @ 30 ml NH$_3$ | 10% Citric Acid + BF @ 30 ml NH$_3$ | 15% Citric Acid + BF @ 30 ml NH$_3$ | 20% Citric Acid + BF @ 30 ml NH$_3$ | 30% Citric Acid + BF @ 30 ml NH$_3$ | 40% Citric Acid + BF @ 30 ml NH$_3$ | 90% Citric Acid + BF @ 30 ml NH$_3$ | 95% Citric Acid + BF @ 30 ml NH$_3$ |
|---|---|---|---|---|---|---|---|---|
| 8 hr | 236 ppm | 135 ppm | 25 ppm | 10 ppm | 0 ppm | 0 ppm | 0 ppm | 0 ppm |
| 24 hr | 46 ppm | 25 ppm | 0 ppm | 0 ppm | 0 ppm | 0 ppm | 0 ppm | 0 ppm |

Testing showed that an increase in ammonia levels to 30 ml did affect the ability for ammonia control for the 5%, 10%, 15%, 20%, 30% Citric Acid+BF mixes. All had airborne ammonia readings after 1 hr. 40%, 90% and 95% Citric Acid had 0 ppm airborne ammonia throughout the testing. The higher levels of ammonia were tested to see how the readings would vary at the lower Citric Acid % levels. At the higher levels it appears to absorb the airborne ammonia levels right away.

In Table 7b, various levels of ammonia (15, 20, 25 and 30 mL) were tested with 35% citric acid. Airborne ammonia levels were tested at 1 hr, 4 hr, 8 hr, 24 hr. All previous test of citric acid formulas that were conducted using 2 ml, 5 ml, & 10 ml of ammonia showed 0 ppm at all time intervals.

TABLE 7b

| Ammonia Applied—15 ml | | Ammonia Applied—20 ml | | Ammonia Applied—25 ml | | Ammonia Applied—30 ml | |
|---|---|---|---|---|---|---|---|
| CITRIC ACID 35% | | CITRIC ACID 35% | | CITRIC ACID 35% | | CITRIC ACID 35% | |
| 1 hr | 5 ppm | 1 hr | 11 ppm | 1 hr | 24 ppm | 1 hr | 37 ppm |
| 4 hr | 0 ppm | 4 hr | 0 ppm | 4 hr | 4 ppm | 4 hr | 6 ppm |
| 8 hr | 0 ppm | 8 hr | 0 ppm | 8 hr | 0 ppm | 8 hr | 0 ppm |
| 24 hr | 0 ppm | 24 hr | 0 ppm | 24 hr | 0 ppm | 24 hr | 0 ppm |

Example 5: Cat Litter Testing

The composition of the present invention can be used as a cat litter. Testing was performed by adding varying amounts of Citric Acid to deionized water to form a spray solution. Various Spray rates were tested.

The lowest amount tested was 0.015% Citric Acid. Results are shown in Tables 8-11.

TABLE 8

Citric Acid Clumping Cat Litter—Ammonia Tests

| Citric Acid Solution Concentration | Application Rate | Citric Acid (g) per Kg of Litter | Ammonia Levels (ppm) | | | |
|---|---|---|---|---|---|---|
| | | | 1 Hour | 4 Hours | 8 Hours | 24 Hours |
| 5% | 3 mL | 0.15 | 77 | 28 | 10 | 0 |
| 5% | 6 mL | 0.30 | 95 | 23 | 7 | 0 |
| 5% | 9 mL | 0.45 | 118 | 29 | 10 | 0 |
| 5% | 12 mL | 0.60 | 107 | 23 | 7 | 0 |
| 5% | 15 mL | 0.75 | 102 | 26 | 9 | 0 |
| 10% | 3 mL | 0.30 | 113 | 27 | 6 | 0 |
| 10% | 6 mL | 0.60 | 121 | 31 | 9 | 0 |
| 10% | 9 mL | 0.90 | 112 | 23 | 9 | 0 |
| 10% | 12 mL | 1.20 | 102 | 19 | 7 | 0 |
| 10% | 15 mL | 1.50 | 112 | 21 | 6 | 0 |
| 20% | 3 mL | 0.60 | 100 | 19 | 11 | 0 |
| 20% | 6 mL | 1.20 | 106 | 22 | 14 | 0 |
| 20% | 9 mL | 1.80 | 113 | 27 | 12 | 0 |
| 20% | 12 mL | 2.40 | 115 | 24 | 8 | 0 |
| 20% | 15 mL | 3.00 | 120 | 27 | 10 | 0 |
| 30% | 3 mL | 0.90 | 122 | 35 | 16 | 0 |
| 30% | 6 mL | 1.80 | 121 | 35 | 11 | 0 |
| 30% | 9 mL | 2.70 | 117 | 26 | 10 | 0 |
| 30% | 12 mL | 3.60 | 109 | 20 | 9 | 0 |
| 30% | 15 mL | 4.50 | 110 | 17 | 8 | 0 |
| 40% | 3 mL | 1.20 | 83 | 28 | 10 | 0 |
| 40% | 6 mL | 2.40 | 68 | 20 | 7 | 0 |
| 40% | 9 mL | 3.60 | 79 | 21 | 5 | 0 |
| 40% | 12 mL | 4.80 | 58 | 15 | 5 | 0 |
| 40% | 15 mL | 6.00 | 40 | 14 | 0 | 0 |
| 50% | 3 mL | 1.50 | 87 | 22 | 8 | 0 |
| 50% | 6 mL | 3.00 | 102 | 19 | 8 | 0 |
| 50% | 9 mL | 4.50 | 71 | 19 | 7 | 0 |
| 50% | 12 mL | 6.00 | 45 | 10 | 0 | 0 |
| 50% | 15 mL | 7.50 | 44 | 6 | 0 | 0 |
| Control | — | — | 129 | 33 | 13 | 0 |

TABLE 9

Citric Acid Clumping Cat Litter - Ammonia Tests

| Citric Acid (g) per Kg of Litter | Ammonia Levels (ppm) | | | |
|---|---|---|---|---|
| | 1 Hour | 4 Hours | 8 Hours | 24 Hours |
| 0.00 | 129 | 33 | 13 | 0 |
| 0.15 (0.015%) | 77 | 28 | 10 | 0 |
| 0.3 (0.03%) | 104 | 25 | 7 | 0 |
| 0.45 (0.045%) | 118 | 29 | 10 | 0 |
| 0.6 (0.06%) | 109 | 24 | 9 | 0 |
| 0.75 (0.075%) | 102 | 26 | 9 | 0 |
| 0.9 (0.09%) | 117 | 29 | 13 | 0 |
| 1.2 (0.12%) | 97 | 23 | 10 | 0 |
| 1.5 (0.15%) | 100 | 22 | 7 | 0 |
| 1.8 (0.18%) | 117 | 31 | 12 | 0 |
| 2.4 (0.24%) | 92 | 22 | 8 | 0 |
| 2.7 (0.27%) | 117 | 26 | 10 | 0 |
| 3 (0.30%) | 111 | 23 | 9 | 0 |
| 3.6 (0.36%) | 94 | 21 | 7 | 0 |
| 4.5 (0.45%) | 91 | 18 | 8 | 0 |
| 4.8 (0.48%) | 58 | 15 | 5 | 0 |
| 6 (0.60%) | 43 | 12 | 0 | 0 |
| 7.5 (0.75%) | 44 | 6 | 0 | 0 |
| Control | 129 | 33 | 13 | 0 |

TABLE 10

Citric Acid Traditional Cat Litter—Ammonia Tests

| Citric Acid Solution Concentration | Application Rate | Citric Acid (g) per Kg of Litter | Ammonia Levels (ppm) | | | |
|---|---|---|---|---|---|---|
| | | | 1 Hour | 4 Hours | 8 Hours | 24 Hours |
| 5% | 10 mL | 0.50 | 40 | 19 | 6 | 0 |
| 5% | 15 mL | 0.75 | 35 | 19 | 4 | 0 |
| 5% | 20 mL | 1.00 | 34 | 21 | 5 | 0 |
| 5% | 25 mL | 1.25 | 34 | 18 | 5 | 0 |
| 5% | 30 mL | 1.50 | 32 | 9 | 5 | 0 |
| 10% | 10 mL | 1.00 | 25 | 15 | 6 | 0 |
| 10% | 15 mL | 1.50 | 26 | 15 | 6 | 0 |
| 10% | 20 mL | 2.00 | 30 | 15 | 5 | 0 |
| 10% | 25 mL | 2.50 | 25 | 16 | 6 | 0 |
| 10% | 30 mL | 3.00 | 26 | 12 | 5 | 0 |
| 20% | 10 mL | 2.00 | 26 | 12 | 9 | 0 |
| 20% | 15 mL | 3.00 | 25 | 14 | 8 | 0 |
| 20% | 20 mL | 4.00 | 25 | 10 | 6 | 0 |
| 20% | 25 mL | 5.00 | 18 | 7 | 6 | 0 |
| 20% | 30 mL | 6.00 | 18 | 5 | 6 | 0 |
| 30% | 10 mL | 3.00 | 22 | 11 | 6 | 0 |
| 30% | 15 mL | 4.50 | 24 | 8 | 7 | 0 |
| 30% | 20 mL | 6.00 | 21 | 4 | 0 | 0 |
| 30% | 25 mL | 7.50 | 12 | 0 | 0 | 0 |
| 30% | 30 mL | 8.00 | 8 | 0 | 0 | 0 |
| 40% | 10 mL | 4.00 | 25 | 13 | 0 | 0 |
| 40% | 15 mL | 6.00 | 24 | 11 | 0 | 0 |
| 40% | 20 mL | 8.00 | 8 | 2 | 0 | 0 |
| 40% | 25 mL | 10.00 | 0 | 0 | 0 | 0 |
| 40% | 30 mL | 12.00 | 0 | 0 | 0 | 0 |
| 50% | 10 mL | 5.00 | 21 | 9 | 0 | 0 |
| 50% | 15 mL | 7.50 | 7 | 2 | 0 | 0 |
| 50% | 20 mL | 10.00 | 0 | 0 | 0 | 0 |
| 50% | 25 mL | 12.50 | 0 | 0 | 0 | 0 |
| 50% | 30 mL | 15.00 | 0 | 0 | 0 | 0 |
| Control | — | — | 107 | 42 | 19 | 0 |

TABLE 11

Citric Acid Traditional Cat Litter - Ammonia Tests

| Citric Acid (g) per Kg of Litter | Ammonia Levels (ppm) | | | |
|---|---|---|---|---|
| | 1 Hour | 4 Hours | 8 Hours | 24 Hours |
| 0.00 | 107 | 42 | 19 | 0 |
| 0.5 (0.05%) | 40 | 19 | 6 | 0 |
| 0.75 (0.075%) | 35 | 19 | 4 | 0 |
| 1 (0.1%) | 30 | 18 | 6 | 0 |
| 1.25 (0.125%) | 34 | 18 | 5 | 0 |
| 1.5 (0.15%) | 26 | 15 | 6 | 0 |
| 2 (0.2%) | 28 | 14 | 7 | 0 |
| 2.5 (0.25%) | 25 | 16 | 6 | 0 |
| 3 (0.3%) | 24 | 12 | 6 | 0 |
| 4 (0.4%) | 25 | 12 | 3 | 0 |
| 4.5 (0.45%) | 24 | 8 | 7 | 0 |
| 5 (0.5%) | 19.5 | 8 | 3 | 0 |
| 6 (0.6%) | 21 | 7 | 2 | 0 |
| 7.5 (0.75%) | 10 | 1 | 0 | 0 |
| 8 (0.8%) | 8 | 1 | 0 | 0 |
| 10 (1.0%) | 0 | 0 | 0 | 0 |
| 12 (1.2%) | 0 | 0 | 0 | 0 |
| 12.5 (1.25%) | 0 | 0 | 0 | 0 |
| 15 (1.50%) | 0 | 0 | 0 | 0 |

In summary, citric acid has numerous benefits. As a weak organic acid, it is less harmful to handle and less toxic than other acids—it is classified by PMRA and EPA as 4A (Minimal Risk) and Generally Recognized as Safe (GRAS). It is found naturally in soil and water and degrades regularly when in contact with a variety of microorganisms that are found in soil, natural waters and sewage treatment systems. It is readily miscible with water, presents minimal transportation safety issues, and can be used in certified organic materials. By contrast, materials currently being used in bedding or litter amendments, such as aluminum sulphate and sodium bisulphate have inherent risks. For example, aluminum sulphate is classified as an environmentally hazardous substance (DOT Hazard 9). Sodium bisulphate is a strong acid that can be very dangerous if used improperly. When mixed with water, it forms the highly corrosive sulfuric acid. Levels of 0.05% or greater by weight in solution can be harmful to fish and other organisms.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims

What is claimed is:

1. An animal bedding or litter amendment composition that reduces ammonia levels in a barn, an animal stall or poultry house containing the animal bedding or litter amendment composition, the composition comprising: 30% to 95% w/w citric acid and one of: a) a clay-based particulate; b) diatomaceous earth; or c) a combination of two or more of a clay-based particulate, diatomaceous earth and an organic material, wherein the citric acid reduces levels of ammonia arising from animal waste in the barn, animal stall, or poultry house.

2. The composition of claim 1, further comprising an insecticide when the clay-based particulate, or the clay-based particulate and the organic material is used in the absence of diatomaceous earth.

3. The composition of claim 1, wherein the amount of citric acid in the composition is 30-50% w/w, 30% w/w, 30-40% w/w, 30% w/w, 35% w/w, 40% w/w, or 50% w/w.

4. The composition of claim 1, wherein the amount of citric acid in the composition is 35% w/w.

5. The composition of claim 1, wherein the clay-based particulate is smectite, attapulgite, sepiolite, bentonite, kaolinite, gypsum, zeolite, montmorillonite, or a combination thereof.

6. The composition of claim 1, wherein the moisture content of the citric acid is less than 12%, less than 5%, less than 1%, or less than 0.5%.

7. The composition of claim 1, wherein the organic material is a wood-based material and/or an agricultural by-product.

8. The composition of claim 1, further comprising an antimicrobial agent.

9. The composition of claim 8, wherein the antimicrobial agent is 2-bromo-2-nitropropane-1,3-diol.

10. A method of reducing ammonia content in a barn, an animal stall or poultry house by applying a composition to an animal bedding or litter in the barn, animal stall or poultry house such that ammonia content is reduced, the composition comprising: 30% to 95% w/w citric acid and one of: a) a clay-based particulate; b) diatomaceous earth; or c) a combination of two or more of a clay-based particulate, diatomaceous earth and an organic material, wherein the citric acid reduces ammonia content arising from animal waste in the barn, animal stall, or poultry house.

11. An animal bedding or litter comprising a composition that reduces ammonia levels in a barn, an animal stall or poultry house containing the animal bedding or litter, the composition comprising: 30% to 95% w/w citric acid and one of: a) a clay-based particulate; b) diatomaceous earth; or c) a combination of two or more of a clay-based particulate, diatomaceous earth and an organic material, wherein the citric acid reduces levels of ammonia arising from animal waste in the barn, animal stall, or poultry house.

12. The animal bedding or litter of claim 11, wherein the animal bedding or litter is for an animal housing.

13. The composition of claim 1, wherein the amount of citric acid in the composition is 30% to 50% w/w.

14. The method of claim 10, wherein the amount of citric acid in the composition is 30% to 50% w/w.

15. The animal bedding or litter of claim 11, wherein the amount of citric acid in the composition is 30% to 50% w/w.

16. The animal bedding or litter of claim 11, wherein the composition further comprises an insecticide when the clay-based particulate, or the clay-based particulate and the organic material is used in the absence of diatomaceous earth.

17. The animal bedding or litter of claim 11, wherein the clay-based particulate is smectite, attapulgite, sepiolite, bentonite, kaolinite, gypsum, zeolite, montmorillonite, or a combination thereof.

18. The animal bedding or litter of claim 11, wherein the moisture content of the citric acid is less than 12%, less than 5%, less than 1%, or less than 0.5%.

19. The animal bedding or litter of claim 11, wherein the organic material is a wood-based material and/or an agricultural by-product.

20. The animal bedding or litter of claim 11, wherein the composition further comprises an antimicrobial agent.

21. The composition of claim 1, wherein the composition comprises one of: a) the clay-based particulate; b) the diatomaceous earth; or c) the combination of a clay-based particulate and diatomaceous earth, and wherein the composition is in granular form.

22. The composition of claim 1, wherein the composition consists essentially of, or consists of, the citric acid and the diatomaceous earth.

23. The composition of claim 1, wherein the composition consists essentially of, or consists of, the citric acid, the clay-based particulate, and the diatomaceous earth.

\* \* \* \* \*